United States Patent [19]

Lee

[11] Patent Number: 4,605,753

[45] Date of Patent: Aug. 12, 1986

[54] SILVER SULFINATE PHYSICAL DEVELOPER FOR HEAT-DEVELOPABLE PHOTOGRAPHIC FILMS

[75] Inventor: Ross A. Lee, Webster, N.Y.

[73] Assignee: E. I. Du Pont de Nemours and Company, Wilmington, Del.

[21] Appl. No.: 714,195

[22] Filed: Mar. 20, 1985

Related U.S. Application Data

[62] Division of Ser. No. 547,472, Oct. 31, 1983, Pat. No. 4,529,689.

[51] Int. Cl.[4] .................... C07F 1/10

[52] U.S. Cl. .................... 556/111

[58] Field of Search .................... 260/430; 556/111

[56] References Cited

U.S. PATENT DOCUMENTS

| | | | |
|---|---|---|---|
| 2,539,728 | 1/1951 | Craven et al. | 260/430 |
| 2,864,769 | 12/1958 | Lutz et al. | 260/430 X |
| 3,133,946 | 5/1964 | Maurer et al. | 260/430 X |
| 3,152,904 | 10/1964 | Sorensen et al. | 96/76 |
| 3,632,342 | 1/1972 | Salesin et al. | 96/98 |
| 3,667,958 | 6/1972 | Evans | 96/114.1 |
| 3,706,565 | 12/1972 | Ericson | 96/114 |
| 3,864,407 | 2/1975 | Yates | 260/430 X |
| 4,066,460 | 1/1978 | Chang et al. | 96/48 R |
| 4,069,759 | 1/1978 | Endo et al. | 101/467 |
| 4,173,482 | 11/1979 | Akashi et al. | 430/619 |
| 4,212,937 | 7/1980 | Akashi et al. | 430/620 |
| 4,258,127 | 3/1981 | Ishibashi et al. | 430/379 |
| 4,258,129 | 3/1981 | Ikenoue et al. | 430/620 |

FOREIGN PATENT DOCUMENTS

| | | |
|---|---|---|
| 2511361 | 9/1975 | Fed. Rep. of Germany . |
| 51-05428 | 5/1976 | Japan . |
| 1476875 | 6/1977 | United Kingdom . |

OTHER PUBLICATIONS

Chemical Abstracts 86, 182245q (1977).
Chemical Abstracts 80, 60010q (1973).
Chemical Abstracts 86, 188866q (1977).
Chemical Abstracts 89, 90199m (1978).
Lindner et al., J. Organometallic Chem. 81, pp. 145–159 (1974).

*Primary Examiner*—Helen M. S. Sneed

[57] ABSTRACT

Improved heat developable silver films are produced upon coating and drying a binder composition containing (a) a substantially light-insensitive silver sulfinate, (b) a silver halide photocatalyst, and (c) a developer. A preferred film contains (a) silver hexadecylsulfinate, (b) a separately sensitized silver halide emulsion and (c) a Phenidone or Dimezone moiety in a coalesced latex binder.

4 Claims, No Drawings

SILVER SULFINATE PHYSICAL DEVELOPER FOR HEAT-DEVELOPABLE PHOTOGRAPHIC FILMS

This is a division of application Ser. No. 547,472, filed Oct. 31, 1983, U.S. Pat. No. 4,529,689.

BACKGROUND OF THE INVENTION

1. Field of the Invention

The present invention relates to photothermographic films, i.e., silver-containing photographic films which develop upon being heated, and in particular, to heat-developable films containing silver sulfinates as physical developers.

2. State of the Art

Historically, photographic silver halide films have been processed by immersing the exposed film into an aqueous developer. In order to simplify the image-forming process, newer dry-processable (photothermographic) films have been produced. These silver-containing films are heat-developable, i.e., produce an image upon being heated. These films enjoy an obvious advantage over the wet development and drying steps required for conventional films. Even so, many disadvantages in terms of sensitivity and stability exist for dry-processable films, and the image produced cannot be employed in as many applications as those from conventional films. Also, the silver salts most widely used in dry-processable films must be coated from an organic solvent, whereas conventional silver films can be applied from aqueous coating compositions.

Heat-developable or photothermographic films conventionally contain a photocatalyst, a silver salt, a developer, and a binder as major components. The silver salt serves as a physical developer to supply the silver for producing the image in these films, in combination with a photocatalyst such as silver bromide. Among the numerous silver salts disclosed for use in these films, silver behenate and silver benzotriazole have been most frequently cited in patent examples.

While silver sulfinates are listed in U.S. Pat. No. 4,258,127 as suitable organic silver salts for a photothermographic layer, this and other references contain no disclosure of how to prepare a useful composition. The reference lists three specific aromatic salts, i.e., silver p-toluene sulfinate, silver p-acetoaminobenzene sulfinate, and silver benzene sulfinate. The latter compound is also disclosed in U.S. Pat. No. 3,152,904 as a light-sensitive photocatalyst for use in a photothermographic composition. German Pat. No. 2,511,361 and Japanese Patent Application J 51054-428 disclose that sulfinic acids and their salts prevent fog and improve image color in dry-processable films. U.S. Pat. No. 4,173,482, 4,212,937, and 4,234,679 all contain a broad disclosure of silver salts of sulfinic acids for use in compositions coated from an organic solvent.

The present invention provides novel light-insensitive silver sulfinates useful as physical developers for photothermographic compositions.

SUMMARY OF THE INVENTION

A new class of substantially light-insensitive silver sulfinates has been discovered which can be used to advantage in coating compositions for the preparation of photographic films. That they are substantially light-insensitive has been demonstrated by tests in which samples of those silver salts have been exposed to room lights for several days with no signs of blackening. Included as light-insensitive sulfinates of the present invention are: silver hexadecylsulfinate, silver dodecylsulfinate, silver nonylsulfinate, silver 3-phenylpropylsulfinate, silver cyclohexylsulfinate.

Hence, in one embodiment the present invention provides novel substantially light-insensitive silver sulfinates, a process for their synthesis, and for their use as physical developers in heat-developable, or photothermographic, dry silver films. These compounds are produced by reacting a silver compound with an alkali metal salt of an alkyl or alkylaryl sulfinate, and they can be used in photothermographic compositions coated from either an aqueous or organic solvent at a pAg of 5–9.

A further embodiment of the present invention is a photothermographic film composition comprising: (a) a substantially light-insensitive silver sulfinate, (b) a photo-catalyst, viz., a photographic silver halide emulsion, (c) a developing (reducing) agent, and (d) a binder, preferably of coalesced latex.

In a preferred embodiment component (a) is silver hexadecylsulfinate, (b) is a chemically sensitized gelatino-silver halide negative or direct positive emulsion, (c) is a phenidone or dimezone moiety, and (d) is an acrylate latex. The photothermographic films of this invention can be used directly for image production or can alternatively be used for image transfer to a receptor or toning, as well as water wash-off and conventional silver halide fixing.

DETAILED DESCRIPTION OF THE INVENTION

The synthesis of this class of light-insensitive silver sulfinates involves the generalized steps of: (I) reacting a thiol with chalcone to form a sulfide, (II) oxidizing the sulfide to a sulfone with permanganate, (III) forming a sodium sulfinate via an alkaline cleavage reaction, and (IV) replacing sodium with silver to form the final product.

A general scheme for synthesis of silver alkylsulfinates is as follows:

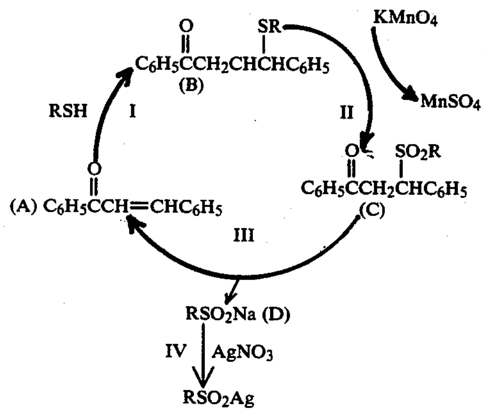

In Step I a 5% excess of chalcone (A) in a basic methanol solution is added to the thiol. Product (B) is reslurried in methanol at least twice to remove any remaining thiol.

In Step II a solvent, acetic acid, and elevated temperature is required to dissolve all of the sulfide (B) in water before reaction. A 5% excess of $KMnO_4$ is used to insure complete oxidation. The product (C) is reslurried twice in water to remove manganese salts. The precipitation of product (C) is enhanced when additional water is added to the final reaction mixture.

In Step III, using tetrahydrofuran as solvent instead of methanol gives improved yield and purity. Insoluble impurities are filtered off before sodium methoxide is added to effect the elimination reaction.

After reaction with silver nitrate (step IV), the silver sulfinate is purified by washing with water.

Within the practice of the present invention, the film can be advantageously prepared from an aqueous coating composition of (a) silver sulfinate, (b) a negative or direct positive photographic silver halide emulsion as the photocatalyst, (c) a developer having a phenidone moiety, and (d) a coalesced acrylic latex. Alternatively, a coating composition from an organic solvent could consist of (a) light-insensitive silver sulfinate, (b) a silver halide emulsion, (c) hydroquinone, and (d) polyvinyl butyral.

The use of an aqueous coating composition provides opportunity to incorporate intercompatible elements which differ from those included in organic solvent coating compositions. In addition to (a) the light-insensitive silver sulfinates, (b) the silver halide emulsion, (c) the developer and (d) the latex binder, other intercompatible ingredients which may be included in an aqueous coated photothermographic film include toners, stabilizers, antifoggants, thermal fog inhibitors and other materials which contribute to producing clear, sharp images and stable storage properties.

Representative examples of the latex polymer or copolymer are butyl methacrylate, methyl methacrylate, ethyl methacrylate, polystyrene, methylmethacrylate-acrylic acid, etc. Surfactants useful for the latex are dioctyl sodium sulfosuccinate, sodium lauryl sulfate, p-tertiary octylphenoxy ethoxy ethyl sulfonate, and other surfactants known in the art of emulsion polymerization.

Gelatin and polyvinyl pyrrolidone may be employed along with the latex as cobinders in a photothermographic composition.

The discovery that surprisingly good results are obtained when photographic silver halide emulsions are used with the light-insensitive silver sulfinates of the present invention in a coalesced latex binder is an unexpected result, since such prior art as U.S. Pat. No. 3,457,075 and U.S. Pat. No. 3,832,186 suggest that in situ conversion of the silver salt is the better way to provide a photocatalyst for a photothermographic film. As a result of the water compatibility of the silver sulfinate and silver halide emulsion, it is possible to achieve superior results in the film when the latex coalesces on evaporation of the water. It is believed that increased contact of the components from the pressure exerted by the coalesced latex contributes to the superior results.

It has been found that the silver halide emulsion can be effectively employed in from 2 to 50 mole percent, based on the total silver salt in the dry processable composition. Silver chloride, silver bromide, and silver iodobromide have all been found to be useful.

The developer moieties preferred in the present invention are of such structure as:

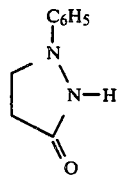
Phenidone

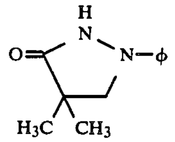
Dimezone

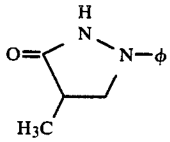
Phenidone B

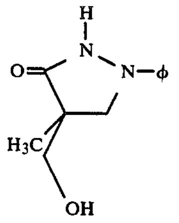
Dimezone S

Other reducing agents suitable as developers for a photothermographic composition using the light-insensitive silver sulfinates of the present invention include: hydroquinone, hydroquinone monosulfonate, ascorbic acid, Metol ® (p-aminophenol sulfate), dodecyl gallate and N-benzyl-p-amino phenol.

Using the novel materials of the present invention, it is possible to provide new heat developable materials that can be processed at temperatures which do not distort a polyester support. It is also possible to use conventional aqueous gelatino-silver halide emulsions which are independently sensitized by methods known in the art as either high speed negatives or direct positives. Further, these materials are suitable for a wide range of uses such as image transfer, water wash-off, and conventional silver halide fixing.

The following examples serve to illustrate the practice of the present invention.

EXAMPLE 1

Synthesis of Sodium Hexadecylsulfinate

Chalcone, 1,3-diphenyl-2-propene-1-one, (42 g, 0.20 moles) and $Me_4NOH$ (0.6 g) were dissolved in 2 l methanol at room temperature. Hexadecanethiol (50 g, 0.19 moles) was added with stirring. A heavy precipitate formed. The mixture was stirred two hours at room temperature. The product was filtered, reslurried, and filtered twice from methanol, and allowed to air dry. The yield was 86 g of sulfide (94%) with a melting point of 67°-68° C.

The sulfide (72 g, 0.15 moles) was dissolved in 2 l acetic acid at 49° C. A solution of 34 g $KMnO_4$ in 700 ml $H_2O$ was prepared and heated to 35° C. to dissolve all of the permanganate. The solution was added to the acetic acid solution with vigorous mechanical stirring. A heavy dark brown precipitate formed. The heat was turned off and the mixture was stirred for two hours. This mixture was tested for residual $KMnO_4$ by spotting on filter paper. No purple color was observed. A solution of 42 g $NaHSO_3$ in 400 ml $H_2O$ was added. The mixture turned white and was stirred for ½ hour. An additional 2 l of water was added and the solution was stirred ½ hour longer. The sulfone product was filtered, then reslurried, and filtered twice from water, and then reslurried and filtered from methanol. The solid was air dried. Sulfone Yield: 72 g (96%); melting point: 111°-114° C.

The sulfone was dissolved in tetrahydrofuran (THF). This solution was filtered through fluted filter paper to remove any solid impurities left from previous steps. Following the addition of sodium methoxide, NaOMe, in methanol, with vigorous stirring, a heavy precipitate formed. The mixture was stirred one hour. The precipitate was filtered, reslurried in THF, filtered, and air dried. The yield was 37 g (91%) of crude sodium hexadecylsulfinate. This was dissolved in 900 ml of water at 85° C. The solution was filtered through fluted filter paper in a hot funnel. The pH was adjusted to about 8 with dilute $H_2SO_4$. Recrystallization was done slowly to prevent formation of small crystals which would plug the filter paper in the procedure. The water solution was cooled to 5° C. and the crystals were filtered and washed once with water at 0° C., then were washed once with acetone and twice with THF. The recrystallized product was air dried, followed by drying in a vacuum oven at 50°-60° C. for two hours. The yield was 94%.

EXAMPLE 2

Synthesis of Sodium Dodecylsulfinate

Chalcone (38 g) was dissolved in 2 l methanol and 0.5 g $Me_4NOH$ was added. Dodecylthiol (35 g) was added and a heavy precipitate formed. The reaction mixture was stirred 2 hours. The resulting sulfide was filtered, reslurried and filtered twice from 1 l methanol, and air dried. The yield was 67 g (94%) and the melting point was 55°-56° C.

Using the procedure of Example 1, the sulfide was converted to the sulfone; the yield was 95%; melting point: 112°-114° C. The sulfone was similarly converted to sodium dodecylsulfinate. This sodium dodecyl sulfinate (35 g) was air dried, dissolved in as little water as possible and the solution filtered through fluted filter paper, cooled very slowly to 0° C., and filtered. The crystal residue was washed with acetone and THF. Yield was 75%.

EXAMPLE 3

Synthesis of Sodium Nonylsulfinate

Chalcone (70 g) was dissolved in 1.7 l methanol and 1.0 g $Me_4NOH$ was added. Nonanethiol (50 g) was added and a precipitate formed. The reaction was run four hours. The product was then filtered, slurried in 500 ml methanol, filtered, and let air dry. Sulfide yield: 93 g (81%); melting point: 44°-45° C. Using the procedure of Example 1, the sulfide was converted to the sulfone (yield 90 g 92%; melting point: 115.5°-118° C.) and the sulfone was converted to the sulfinate.

The crude product was dissolved in as little 2-propanol as possible, filtered through fluted filter paper, and let cool. The solution was cooled to 5° C. in an ice bath, and the crystal residue was filtered, washed with cold 2-propanol, followed by two washes with THF, and air dried. Yield was 72%; (some was lost in the filtration).

EXAMPLE 4

Synthesis of Sodium 3-Phenylpropylsulfinate

Chalcone (110 g) was dissolved in 2 l methanol and about 1 g $Me_4NOH$ were added. 3-phenylpropanethiol (75 g, 74.25 ml) was added and the solution was stirred twelve hours. The product was filtered, slurried in 800 ml MeOH, filtered, and air dried. Sulfide yield: 115 g (65%); melting point: 59°-61° C.

Using the procedure of Example 1, the sulfide was converted to the sulfone (yield: 118 g 96%; melting point: 132.5°-134° C.) and the sulfone converted to the sulfinate.

Recrystallization was done by dissolving the sulfinate in as little hot MeOH as possible filtering the solution, adding of 2-propanol, and adding hot hexane until the solution turned cloudy. The solution was slowly cooled, placed in an ice bath, and filtered. Yield: 89%.

EXAMPLE 5

Synthesis of Sodium Cyclohexylsulfinate

Chalcone (140 g) was dissolved in 3 l methanol and 1.5 g $Me_4NOH$ was added. Cyclohexanethiol (75 g, 78.9 ml) was added and the solution was stirred for 15 hours. The solution was cooled, filtered, washed with 200 ml cold methanol, and air dried. The sulfide yield was 157 g (75%); melting point: 60°-61° C.

Using the procedure of Example 1, the sulfide (155 g) was converted to the sulfone (yield: 92%; melting point: 140°-141° C.) and the sulfone was converted to the sulfinate.

EXAMPLE 6

Synthesis of Sodium Hexylsulfinate

Chalcone (140 g) was dissolved in 2.5 l of methanol and 2 g $Me_4NOH$ was added to the solution. Hexanethiol (75 g) was added and the solution was stirred for 15 hours. The solution was cooled to 5° C., filtered, washed with 200 ml of cold methanol, and air dried. Sulfide yield: 180 g (72%); melting point: 60°-61° C.

Using the procedure of Example 1, the sulfide was converted to the sulfone, (yield: 73%; melting point: 117°-120° C.) and the sulfone was converted to the sulfinate.

The sodium hexylsulfinate must be kept in a desiccator, else it absorbs water and decomposes. The yield was 68%. Recrystallization was from ethanol/THF. Recrystallization yield: 56%.

EXAMPLE 7

Synthesis of Sodium 1,4 Butanedisulfinate

Chalcone (220 g) was dissolved in 5.5 l of methanol and 1 g $Me_4NOH$ was added. 1,4-butanedithiol (60 g) was added and the solution was stirred for 15 hours. The precipitate was filtered, reslurried and filtered twice from 2 l methanol, and air dried. Sulfide yield: 256 g (97%); melting point: 129°-135° C.

Using the procedure of Example 1, the sulfide was converted to the sulfone, and this to the sulfinate. The sulfone yield was 98%; and the melting point was 197°-202° C.

The sulfinate, a brown solid, was dissolved in methanol, filtered, and precipitated using THF. A faintly yellow solid was obtained.

EXAMPLE 8

Synthesis of Sodium 1,9-Nonanedisulfinate

Chalcone (120 g) was dissolved in 3 l methanol and 1.0 g $Me_4NOH$ was added. 1,9-nonanedithiol (50 g) was added and the solution was stirred for two days. The product was filtered, reslurried and filtered twice in 800 ml methanol, and air dried. Sulfide yield: 148 g 93%; melting point: 68°-71° C.

The sulfide (143 g) was converted to the sulfone, and this to the sulfinate, by the procedure of Example 1. The sulfone yield: 84%; melting point: 155°-158° C.

The crude, brown, sulfinate was dissolved in 60° $H_2O$ and filtered, through fluted filter paper. Hot acetone was added until a precipitate began to form. The solution was let cool, cooled in an ice bath, filtered, and the solid product washed with acetone. A faintly yellow solid was obtained. The yield was 53%.

EXAMPLE 9

Preparation of Silver Hexadecylsulfinate

Taking material from Example 1, eight grams of sodium hexadecylsulfinate (0.026 moles) was dissolved in 300 ml deionized water at 45° to 50° C. When measured at 45° C. the pH was 9.0 and the millivolt reading, using a silver/silver sulfide electrode and a silver chloride/4M KCl reference electrode, was −24. The pH was adjusted to 6.9 with 1:20 $HNO_3/H_2O$. A solution of 7 ml 3N $AgNO_3$ and 200 ml $H_2O$ was added with stirring to this mixture in four portions of 50 ml each, stirring 2 minutes after each addition, and stirring 10 minutes after the final addition. Temperature was maintained at 40° to 45° C. The final mixture had a pH of 3.6 and a millivolt reading of +206 at 40° C. This corresponds to a pAg of 6.4.

The mixture was cooled to room temperature and then refrigerated. The solid was collected and washed several times with deionized water. The silver hexadecylsulfinate weighed 9.3 g and had infrared spectra peaks at 1080 $cm^{-1}$, 1060 $cm^{-1}$ and 970 $cm^{-1}$.

In addition, it was found that silver hexadecylsulfinate could also be prepared from sodium hexadecylsulfinate prepared by three different techniques, i.e. base cleavage of hexadecylsulfonyl hydrazide, base cleavage of hexadecylsulfonyl hydrazone of dimedon, and displacement of hexadecylsulfonyl methyl phthalimide.

EXAMPLE 10

Preparation of Silver Dodecylsulfinate

Using the material from Example 2, 7 g of sodium dodecylsulfinate was dissolved in 300 ml $H_2O$ at 32° C. A silver solution was prepared by adding 7 ml of 3N $AgNO_3$ to 200 ml $H_2O$. With stirring between additions, the silver solution was added in four 50 ml portions to allow reaction to convert from the sodium salt to the silver salt. The reaction mixture at 32° C. gave a pH of 3.8 and a pAg of 6.3. The product was filtered, washed with four 100 ml portions of $H_2O$, and dried.

EXAMPLE 11

Preparation of Silver Nonylsulfinate

Using the material from Example 3, 3 g of sodium nonylsulfinate was dissolved in 150 ml $H_2O$ at room temperature. Four 25 ml portions of a silver solution prepared by adding 3.5 ml 3N $AgNO_3$ to 100 ml $H_2O$ were added with stirring to the dissolved sodium nonylsulfinate to give a final pH of 6.6 and a pAg of 6.6 (240 mV). The product was filtered, washed first with water and then with water/methanol, and then dried. Infrared spectra of the silver nonylsulfinate showed strong absorption at 1080, 1060 and 970. The salt did not appear to be appreciably light sensitive when exposed to room light for a period of several days.

EXAMPLE 12

Other silver salts may be prepared from the corresponding sodium salts according to the method of Example 9, 10 and 11 wherein the silver salt is precipitated from aqueous solution by adding dilute silver nitrate. A common characteristic for these silver sulfinates was the observation that they are substantially light-insensitive, in that the washed and dried product does not show signs of darkening when allowed to stand exposed to normal light for several days.

EXAMPLE 13

Heat-Developable Photographic Material With In Situ Conversion

A. Silver Hexadecylsulfinate Dispersion

Silver hexadecylsulfinate (4 g) was added to 20 g of deionized water containing 0.25 g of the surfactant Triton X-100® (octylphenoxy polyethoxy ethanol) and stirred until the solid was completely wetted. The mixture was placed in a polypropylene bottle filled about one third with 5 mm glass beads and one small grinding ball and placed on an Eberbach Model 20-240 shaker for 4 hours.

B. Phenidone B Dispersion

Two grams of Phenidone B from Ciba Geigy (4-methyl-1-phenylpyrazolidin-3-one) was mixed with 0.02 g Triton® X-100 and 0.2 g of a solution of 5% polystyrene sulfonate in water. 20 ml of water was then added followed by 0.2 ml of ethylene glycol and 0.7 ml of a solution of 2.5% aqueous hydroxyethyl cellulose (Cellosize®). The mixture was transferred to a polypropylene bottle filled one third full with 5 mm glass beads and one small grinding ball and placed in the Eberbach Model shaker overnight.

C. Film Preparation

The following formulation was prepared:

1.7 g silver hexadecylsulfinate dispersion from A 0.7 ml poly(butyl methacrylate/butyl acrylate/diacetone acrylamide, 85/10/5 latex (30% solids), Igepal® CA-890 surfactant, i.e., octylphenoxypoly(ethyleneoxy)ethanol from GAF 0.2 ml 7% aqueous gelatin solution.

Before proceeding with the next addition the room was placed under photographic safelights.

To the silver salt, latex and gelatin mixture was added:

0.2 ml 0.3N KBr

The mixture was stirred at 35° C. for 15 min. cooled to room temperature and 0.8 ml Phenidone B Dispersion added.

After stirring for 30 seconds the mixture was coated on a polyethylene terephthalate support using a No. 30 Consler wire wound bar and dried at room temperature in a hood.

D. Testing

A film sample was exposed with a flash of a 100 watt xenon strobe unit (Monolite® 400 at ¼ setting) at a distance of 15 cm and exposed by heating for 15 seconds at 93° C. in a Seal heat mounting press with the back in contact with the hot platen and the emulsion side in contact with Seal release papers. An excellent negative image was produced with a D max of 3.2 and a D min of 0.08 as measured in a MacBeth densitometer using a blue filter. The image produced eventually printed up as the unexposed areas darkened. A stable image was produced by fixing the heat developed material for 1 minute at room temperature in ammonium thiosulfate, washing in running water, and drying.

EXAMPLE 14

Heat-Developable Photographic Material with Primitive Silver Halide

A. Primitive Emulsion Preparation

A fine grain gelatino-silver bromide emulsion was prepared using balanced double jet precipitation. Particle size analysis indicated crystals with a mean volume of 0.0005 cubic microns and a mean edge length of 0.08 micron. The emulsion was dispersed by adding water, raising the pH, and stirring at 35° to 50° C. for 30 to 60 minutes. The final dispersion had a silver analysis of 4.5% (calculated as Ag°), a pAg of 6.7 (adjusted with dilute $AgNO_3$) and a pH of 6.5.

B. Film Preparation

The following formulation was prepared:

5.6 g of silver hexadecylsulfinate dispersion (A in Example 13)

0.06 g sodium hexadecylsulfinate (from Example 1).

The mixture was stirred for 5 minutes at room temperature. Measured at 20° C. the pH was 3.17 and the pAg was 7.9.

An addition of 2.3 ml latex (as in Example 13) was made and the mixture was stirred for 5 minutes.

A 2.4 g portion of this mixture was split off and the following additions were made under safelight conditions; 0.6 ml of a 1.2% aqueous gelatin solution followed by 0.2 ml of the fine grain primitive emulsion. The mixture was stirred for one hour at 35° C. and then cooled to room temperature. Then 0.8 ml of phenidone B dispersion (B in Example 13) was added and the mixture stirred 30 seconds and coated as in Example 13.

C. Testing

When a film sample was exposed and heat developed as in Example 13 an excellent image was produced with a D max of 1.9 and a D min of 0.12. As in Example 13 the films printed up in the unexposed region with time as they were exposed to room light, however stable images were obtained by fixing.

EXAMPLE 15

Heat-Developable Photographic Material With Sensitized Silver Halide

A. Chemical and Spectral Sensitized Emulsion

The primitive fine-grained silver bromide emulsion of Example 14 was sensitized as follows.

At 52° C. a 2-liter portion of the primitive emulsion received the following additions:

72 ml of $1.28\times10^{-4}$M $HAuCl_4$ 42 ml of 0.17M KSCN 60 ml of $4.36\times10^{-4}$M $Na_2S_2O_3$.

The emulsion was stirred for 90 minutes at 52° C. Then 84 ml of 0.33M 4-hydroxy-6-methyl-1,3,3a,7-tetraazaindene was added. The emulsion was cooled to 35° C. and received 210 ml of 0.1% ethyl thiazolonylidene ethylidene carboxymethylrhodanine in methanol. After a 2 minute stir at 6 ml portion of 2.3% thymol in ethanol was added and stirring continued for a final 2 minutes.

B. Film Preparation

The following formulation was prepared:

5.6 g silver hexadecylsulfinate dispersion (A of Example 13)

0.06 g sodium hexadecylsulfinate (Example 1).

The mixture was stirred five minutes at room temperature. Then 2.3 ml of latex (Example 13) was added followed by a 5 minute stir.

A 2.4 g portion of this mixture was split off and the following additions were made under safelights: 0.4 ml of 1.2% aqueous gelatin solution followed by 0.4 ml of the sensitized emulsion from Step A. The mixture was stirred for 1 hour at 35° C. and then cooled to room temperature. Then 0.8 ml of Phenidone B dispersion (B in Example 13) was added and the mixture stirred one minute and coated as in Example 13.

C. Testing

A sample was exposed in an EGG sensitometer at 10 seconds through a wedge with a filter simulating the P-11 phosphor spectral response of cathode ray tubes. Heat development as in Example 13 gave a D max of 2.4 and D min of 0.36. Fixing the sample to prevent print up produced a high speed, stable image with a D max of 2.12 and D min of 0.18. This film using sensitized emulsion had about six times the speed of the film of Example 14 using primitive emulsion, demonstrating the advantage in using sensitized gelatino silver halide emulsion in these aqueous coated dry developable films.

EXAMPLE 16

Silver Dodecylsulfinate Heat-Developable Films

A. Dispersion Preparation

The following ingredients were combined and milled for 4 hours as in Example 13.

4 g silver dodecyl sulfinate 0.25 g Triton ® X-100

20 ml Deionized water.

B. Film Preparation

The following were mixed together:

4.82 g Dispersion A above 0.8 ml Deionized water 0.05 g sodium dodecylsulfinate (Example 2).

Measured values were pH 4.2 and pAg 7.3.

Next after adding 2.3 ml latex (Example 13), the mixture was split into three portions, i.e., A, B and C.

Under safelight conditions the following additions were made: (Each split was stirred 1 hr. at 35° C. after adding the halide or emulsion and 1 min. at room temperature after adding the Phenidone B dispersion.)

To A: 0.2 ml 3.5% aqueous gelatin followed by 0.2 ml 0.3N KBr and 0.8 ml Phenidone B dispersion (B in Example 13).

To B: 0.4 ml primitive emulsion (Example 14) and 0.8 ml Phenidone B dispersion (B in Example 13)

To C: 0.4 ml sensitized emulsion (Example 15) and 0.8 ml Phenidone B dispersion (B in Example 13).

The three splits were coated as in Example 13.

C. Testing

Samples of A and B exposed as in Example 13 were developed for 15 seconds at 93° C. and gave good images which could be stabilized by fixing. A sample of C was exposed as in Example 15 and similarly heat developed and fixed.

EXAMPLE 17

Silver Nonylsulfinate Heat-Developable Film

A. Silver nonylsulfinate Dispersion

The following ingredients were combined and milled for 2 hours in a polypropylene bottle filled one third full with glass beads and a small grinding ball.

1 g silver nonylsulfinate (Example 11)
0.06 g Triton ® X-100
5 ml $H_2O$.

B. Film Preparation

The following were combined as indicated:

1.3 g Dispersion A above
0.015 g sodium nonylsulfinate (Example 3).

After the mixture was stirred one minute:

0.7 ml latex (Example 13) was added.

The next addition under safelights:

0.4 ml fine grain sensitized emulsion C (Example 15).

The combined ingredients were then digested for 1 hr at 35° C. before final addition was made of 1.2 ml of solution comprising 6 ml acetone, 3 ml methanol and 16 ml water.

The composition was coated and dried as in Example 13.

C. Testing

A film sample was swabbed with a solution of 4% Dimezone S in methanol and allowed to dry. The sample was exposed as in Example 15 and heat developed for 15 seconds at 115° C. This gave an image which could be stabilized by fixing with a D max of 0.7 and D min of 0.4.

EXAMPLE 18

Comparative Example Prior Art Silver Sulfinate

Silver benzene sulfinate is described by Sorensen and Shepherd in U.S. Pat. No. 3,152,904 as a light-sensitive silver salt. A sample of this silver salt was prepared by precipitation from the sodium salt according to the technique of Example 9. Measured at 20° C. the precipitation solution gave a final pH of 6.71 and a millivolt reading of +488 corresponding to a pAg of 2.5. Thus, the low pAg for light-sensitive silver benzene sulfinate was determined to be outside the range of the much higher pAg values (5 to 8) of the substantially light-insensitive silver sulfinates of the present invention.

EXAMPLE 19

A film was prepared as in Example 15 except that a 0.001 cubic micron silver chloride emulsion was used instead of the silver bromide emulsion and a solution of 2 g Dimezone S dissolved in 16 g $H_2O$ and 9 ml 2:1 acetone/methanol was used instead of the Phenidone B dispersion. The film was exposed as in Example 15 but heat developed for 20 seconds at 93° C. After fixing, the film gave a D max of 0.95 and D min of 0.20.

This example illustrates that films of the present invention are not limited to particular types of silver halide emulsions or developers since many substitutions known in the art are possible.

EXAMPLE 20

Direct Positive Heat Developable Film

A dispersion of silver hexadecylsulfinate was prepared by mixing:

4 g silver hexadecylsulfinate
12 drops Zonyl ® FSN (fluorinated alkyl polyoxyethylene ethanol)
0.3 g Igepal ® CA-890
1.6 g phthalazinone dispersed in 0.2 g Triton ® X-100.
20 ml $H_2O$.

The mixture was ball milled for 150 minutes, then 10 ml of latex (Example 13) was added and the mixture was ball milled for an additional 60 minutes.

The following formulation was prepared:

2.4 ml above dispersion
0.02 g sodium hexadecylsulfinate (Example 1)
0.3 ml of fine grain, rhodium doped, fogged direct positive emulsion.

The mixture was heated at 35° to 37° C. for 60 minutes. 0.4 ml $H_2O$ was added and the mixture was coated and dried as in Example 13.

A sample of the film was swabbed with a solution of 1% Dimezone S in methanol and dried. The film was exposed through a step wedge with a Xenon NuArc ® for 20 seconds and heated 30 seconds at 115° C. to give a direct positive image. The image was stabilized by fixing in sodium thiosulfate for 20 minutes at room temperature. This example illustrates the application of the present invention to direct positive imaging using conventional direct positive emulsions.

EXAMPLE 21

Wash-Off Film

A silver salt dispersion was prepared as follows:

2 g silver hexadecyl sulfinate
10 ml $H_2O$
0.15 g Igepal ® CA-890
0.1 g Triton ® X-100
6 drops Zonyl ® FSN
0.14 g sodium hexadecylsulfinate.

After milling for 2 hours the dispersion had a pH of 4.84 and a pAg of 7.2 at 20° C.

The following was stirred together for 2 minutes:

1.7 ml above dispersion
0.7 ml latex (Example 13) with pH adjusted to 6.7.

This was heated to 35° C.

At 35° C. a 0.6 ml portion of a gold/sulfur and dye-sensitized silver iodobromide emulsion was added to the silver salt-latex mixture and stirred together for 30 minutes. The mixture was cooled to 16°-21° C. prior to addition of 0.8 ml of a solution of 2 g Dimezone S in 16 ml $H_2O$ and 9 ml 2:1 acetone/methanol.

The formulation was coated with a 4 mil knife and dried.

A sample was exposed as in Example 15 and then heated for 10 seconds at 128° C. The resulting film which had a good image was placed under warm tap water and rubbed with soapy water. As a result, the exposed and developed areas preferentially washed off. The remaining coating printed up to give a positive image of the step wedge used as a target. This image was completely stable to any further change.

EXAMPLE 22

Reversal Image

A silver salt dispersion was prepared with the following:

1 g silver hexadecylsulfinate
3 drops Zonyl ® FSN
1 g Igepal ® CA-890
0.4 g phthalazinone 0.05 g Triton ® X-100
5 ml $H_2O$.

The dispersion was milled for 1 hour.
2.5 ml latex C (Example 13) was added.

The dispersion was milled an additional hour.

A coating composition was prepared with the following under safelight conditions:
2.5 ml the above dispersion
0.2 ml 0.3M KBr.

The reaction mixture was stirred 2 minutes before adding:
0.2 ml 0.25M benzotriazole in aqueous ethanol
0.5 ml solution of 2 g Dimezone S in solution of 16 ml $H_2O$ and 6 ml 1:1 acetone/methanol.

The mixture was stirred 1 minute and then coated with a 3 mil knife and dried.

A film sample was exposed to 1 flash of Example 13 Monolite on low power, and heated for 10 seconds at 93° C. to produce a weak negative image. The sample was then reexposed to Monolite for 4 flashes at full power, then reheated for 10 seconds at 93° C. to produce a reversal image with a D max of 0.94 and a D min of 0.28 which was substantially stable to print up.

A fresh sample of the film was given an imagewise exposure of 4 flashes Monolite at full power (400 Watt) and heated for 10 seconds at 93° C. A good negative image was produced with D max of 1.0 and D min of 0.09.

EXAMPLE 23

Microfiche Quality Film

A silver salt dispersion was prepared containing:
2 g silver hexadecylsulfinate
10 ml $H_2O$
0.15 g Igepal ® CA-890
0.1 g Triton ® X-100
0.14 g sodium hexadecylsulfinate.
The dispersion was milled 2 hours as in Example 13.

A coating composition was prepared as follows under safelights:
1.7 ml above dispersion
0.7 ml latex (Example 13)
0.4 ml 0.0005 cubic micron chemical and dye sensitized silver bromide emulsion.
The mixture was stirred 30 minutes at 35° C. and then cooled to room temperature before adding:
0.8 ml solution of 2 g Dimezone S in solution of 16 ml $H_2O$ and 9 ml 2:1 acetone/methanol.

The composition was coated and dried as in Example 13.

A sample of the film was exposed through a 48X microfiche on a K & M point source for 15 sec and then heated 10 seconds on a drum at 121° C. The sample gave a good image with readable characters. The sample was stabilized by fixing for 2 minutes in ammonium thiosulfate and washing 10 seconds in water.

EXAMPLE 24

Peel Apart Imaging

A film sample was prepared, exposed, and heat treated as in Example 16. After heat development the imaged and developed areas remained tacky at room temperature. The film was placed emulsion side down on a piece of paper and thumb pressure applied on the back. The film and paper were peeled apart and the developed area selectively transferred to the paper. The remaining film printed up to a positive image that was stable to further change. The transferred image was also stable to further change.

Peel apart images were similarly prepared with films prepared as in Example 23. Developed areas could be selectively transferred to aluminum, proofing paper and color mount paper.

EXAMPLE 25

Toned Films

Exposed and developed films exhibiting tacky areas as in Example 23 could be toned with Cromalin ® toners in both the original coating or after being transferred as in Example 24.

EXAMPLE 26

Polystyrene Latex Film Composition

A silver salt dispersion was prepared as in Example 13. A coating composition was prepared as follows:
1.8 g silver salt dispersion
0.02 g sodium hexadecylsulfinate.

The mixture was stirred 2 minutes at room temperature prior to adding 0.7 ml of polystyrene latex (prepared by emulsion polymerization using Igepal ® CA-890 surfactant).

The mixture was stirred 2 minutes and then under safelight conditions there was added 0.4 ml of the emulsion of Example 15.

The mixture was digested one hour at 35° C. and cooled to room temperature before adding 0.8 ml of a solution of 2 g Dimezone S in 16 ml $H_2O$ and 6 ml 1:1 acetone/methanol.

The composition was coated and dried as in Example 13. After exposure a sample was developed for 20 seconds at 93° C. The sample had a D max of 1.85 and a D min of 0.6. The high D min was due to the hazy quality of the coating.

While this example does illustrate that it is possible to use different types of latex to produce heat developable films, it does suggest that some such as the acrylate latex used in other examples may be superior for obtaining low D min.

EXAMPLE 27

Gelatin As Film Binder

The following ingredients were combined:
2 g silver hexadecylsulfinate
10 ml $H_2O$
0.1 g Triton ® X-100
0.15 g Igepal ® CA-890
6 drops Zonyl ® FSN
0.14 g sodium hexadecylsulfinate.

A dispersion was produced by ball milling for 3 hours. At 20° C. the pH was 5.4 and the pAg was 7.5 (164 mv).

A coating composition was prepared with the following:
1.7 ml above dispersion
0.7 ml $H_2O$
0.1 g gelatin.
The composition was stirred at 35° C. for 10 min and under safelight conditions an addition was made of 0.3 ml of the emulsion of Example 15.

The composition was stirred 30 minutes while the temperature was maintained between 32° to 37° C. Just prior to coating 0.4 ml of a solution of 2 g Dimezone S in a solution of 16 ml $H_2O$ and 6 ml 1:1 acetone/methanol was added. The composition was stirred 30 sec. and coated with a 4 mil knife and dried.

A sample was exposed as in Example 13 and heated for 30 seconds at 121° C. No appreciable image was obtained. An image was obtained using conventional silver halide development.

While the sample with gelatin binder did not give thermal development, a sample prepared with 0.7 ml of latex gave a good image when heated.

EXAMPLE 28

Polyvinylpyrrolidone As Film Binder

The following ingredients were added in order into 7 g deionized water.

0.06 g Triton® X-100
1 g silver hexadecylsulfinate.

A dispersion was formed by milling for 2 hours.

A coating composition was prepared with the following:

1.8 g above dispersion
0.02 g sodium hexadecylsulfinate.

The dispersion was stirred for 1 minute at room temperature. Under safelights the next additions were 0.7 ml of 10% aqueous polyvinylpyrollidone (molecular wt. 30,000) and 0.4 ml emulsion of Example 15.

The mixture was digested for 1 hour at 35° C.

An addition was next made of 0.8 ml of a solution of 2 g Dimezone S in a solution of 18 ml $H_2O$ and 9 ml 2:1 acetone/methanol. The composition was coated as in Example 13. Unlike other coatings the film appeared to spontaneously reduce somewhat in the coating solution and the coated film. Samples of the film were exposed as in Example 13 and heat developed for 20 seconds at 93° C. giving a D max of 0.75 and a D min of 0.30.

When the same example was repeated except for substituting 0.7 ml latex for the polyvinylpyrrolidone, the same exposure and heat development yielded a sample with a D max of 1.10 and D min of 0.30 but with a three-fold increase in speed.

As expected, the slower film containing polyvinylpyrrolidone as the binder printed up at a slower rate than the latex film. Both coatings could be stabilized by fixing in ammonium thiosulfate for 2 minutes at room temperature.

EXAMPLE 29

Attempts to fix commercially available dry silver films under conditions which work for films of the present invention did not succeed. Whereas there was no change in the silver coating weight for these prior art films after treatment with ammonium thiosulfate, in films prepared according to the present invention there was no silver detected in the unexposed areas after treatment with ammonium thiosulfate.

EXAMPLE 30

Tonable Film Composition

A silver salt dispersion was prepared as in Example 23.

A developer dispersion was prepared as follows:

11 g Dimezone
40 ml $H_2O$
110 mg Zonyl® FSN
10 ml methanol.

This was milled for 2 hours on a shaker.

A coating composition was prepared under safelight conditions by combining:

1.7 ml silver salt dispersion
0.7 ml latex (Example 13).

It was stirred 2 minutes at room temperature before adding:

0.6 ml of a 0.005 cubic micron silver iodobromide emulsion which was gold-sulfur and dye-sensitized.

The composition was stirred 30 minutes at 35° C. before the addition of:

0.8 ml above developer dispersion.

The composition was coated with a 4 mil knife onto a polyethylene terephthalate support and dried at room temperature.

A sample was exposed as in Example 15 and heat developed for 15 seconds at 121° C. on a Seal press. While warm, the tacky developed areas were selectively toned with Du Pont Cromalin® cyan toner. The undeveloped areas did not accept toner.

EXAMPLE 31

Image Enhancement

Films prepared according to the present invention demonstrated blacker images when swabbed with phenylmercaptotetrazole. Sodium phenylmercaptotetraazole was similarly observed to give blacker images when swabbed on films before development.

EXAMPLE 32

Silver hexadecylsulfinate was milled in a polyvinylbutyral binder and partially converted to silver bromide by the addition of potassium bromide. Hydroquinone was added as a developer and the composition was coated from an organic solvent and dried to form a film on a polyethylene terephthalate support. A sample was exposed and heat developed to produce an image.

This example illustrates that the novel silver sulfinates of the present invention are not limited to aqueous coatings but can be used with solvent coating systems well known in the art.

We claim:

1. A process for the synthesis of a silver sulfinate according to the following reaction:

I. reacting a thiol (RSH) with chalcone $$(C_6H_5\overset{\overset{O}{\|}}{C}CH{=}CHC_6H_5)$$

to form a sulfide $$(C_6H_5\overset{\overset{O}{\|}}{C}CH_2\overset{\overset{SR}{|}}{C}HC_6H_5);$$

II. oxidizing said sulfide to a sulfone $$(C_6H_5\overset{\overset{O}{\|}}{C}CH_2\overset{\overset{SO_2R}{|}}{C}HC_6H_5);$$

III. converting said sulfone by means of an alkaline cleavage reaction to form a sodium sulfinate $$(C_6H_5\overset{\overset{O}{\|}}{C}CH{=}CHC_6H_5 + RSO_2Na);$$

and

IV. reacting said sodium sulfinate with silver nitrate to form silver sulfinate, where RSH in step I is a thiol taken from the group consisting of hexadecanethiol, dodecylthiol, nonylthiol, hexanethiol, 3-phenylpropanethiol, cyclohexanethiol, 1,4-butanedithiol, and 1,9-nonanedithiol.

2. A silver sulfinate prepared according to claim 1 which when washed and dried do not show signs of darkening when allowed to stand exposed to normal light for several days.

3. A process according to claim 1 for the synthesis of silver hexadecylsulfinate comprising the steps of:

reacting chalcone and hexadecanethiol to form the corresponding sulfide, oxidizing the sulfide to the corresponding sulfone, converting the sulfone by means of an alkaline cleavage reaction to sodium hexadecylsulfinate, and reacting the sulfinate with silver nitrate to form silver hexadecylsulfinate.

4. A silver sulfinate prepared according to claim 2 selected from the group consisting of silver hexadecylsulfinate, silver dodecylsulfinate, silver nonylsulfinate, silver 3-phenylpropylsulfinate, and silver cyclohexylsulfinate.

* * * * *